3,097,494
SUPPORTING FRAMEWORK FOR A MINE
GALLERY OR SHAFT
Georges Chapron, 22 Bernonville,
Auberchicourt, Nord, France
Filed July 21, 1959, Ser. No. 828,587
Claims priority, application France July 29, 1958
5 Claims. (Cl. 61—45)

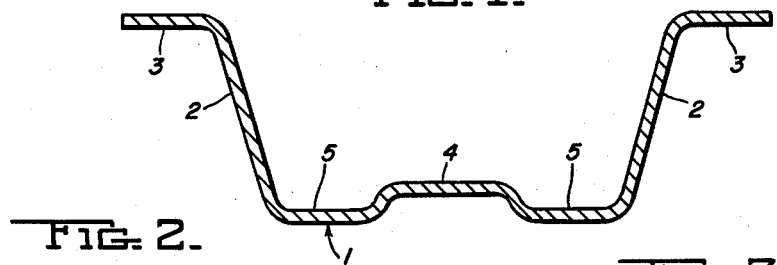
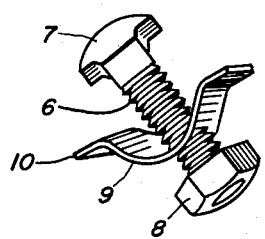
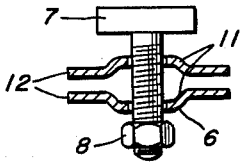
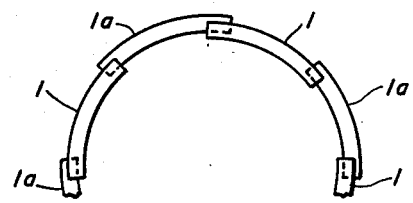
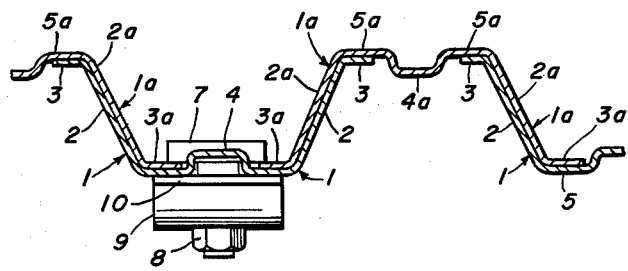
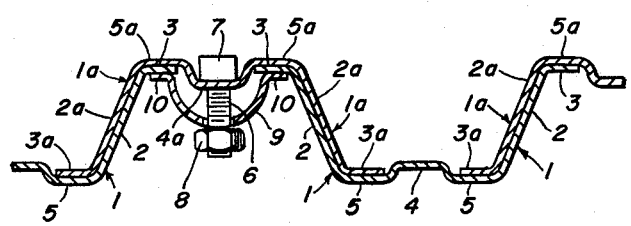
INVENTOR.
GEORGES CHAPRON INVENTOR.
GEORGES CHAPRON
By *Christy, Parmelee & Strickland*
Attorneys United States Patent Office 3,097,494
Patented July 16, 1963

The invention relates to a supporting framework, for a mine gallery or shaft or for a similar underground working intended to replace the usual arrangements comprising a framework, bracing members which space the frame members apart and the present systems of lining (wooden, metal, gratings or sheet piling).

The frame according to the invention comprises two essential elements: One, forming the crown or foot, is constituted by a profiled member whose section has the shape of a flattened omega of which the crest itself presents a middle groove with a flat base between two elevated parts with a flat base, or of a flattened U whose bottom itself presents a flat middle elevation between two grooves with flat bases, this profiled member being bent in the shape of an arc in the direction of its length. The other element is a connection stirrup comprising a headed bolt, a nut and either a locking plate of U-shape pierced by a hole for the passage of the bolt or two locking plates of very flat U shape with wide wings.

Figure 5:
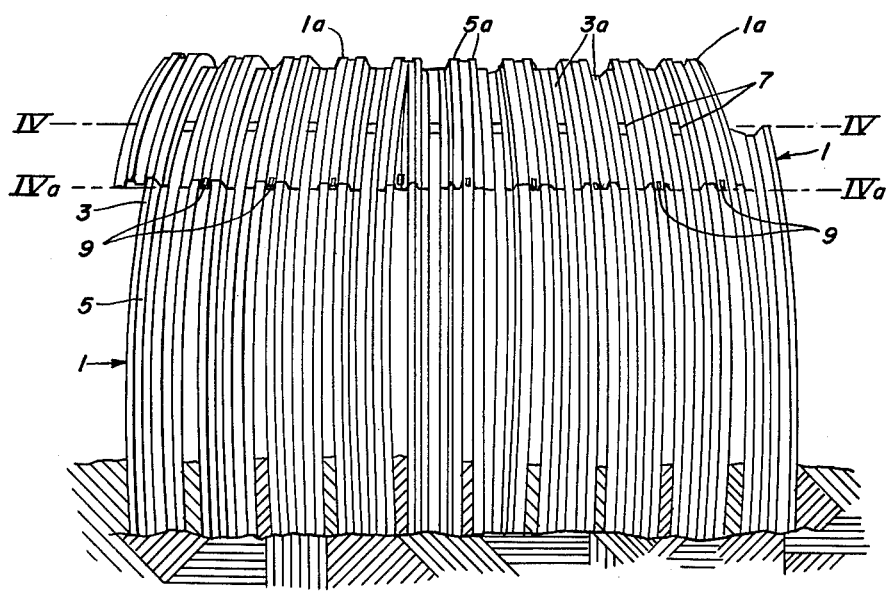

The various elements constituting the invention are illustrated diagrammatically and by way of example in the accompanying drawings:

FIGURE 1 is a cross-section of an element forming a crown or foot,

FIGURE 2, a perspective view of a first type of stirrup,

FIGURE 3, a section of a second type of stirrup,

FIGS. 4 and 4a are fragmentary sections similar to FIGURE 1, respectively on the lines IV—IV and IVa—IVa of FIGURE 5, illustrating the connection of elements of the kind shown in FIGURE 1 by means of stirrups of the kind shown in FIGURE 2, FIGURE 5, an elevation, in perspective, illustrating an assemblage of frames in accordance with the invention.

Figure 6:
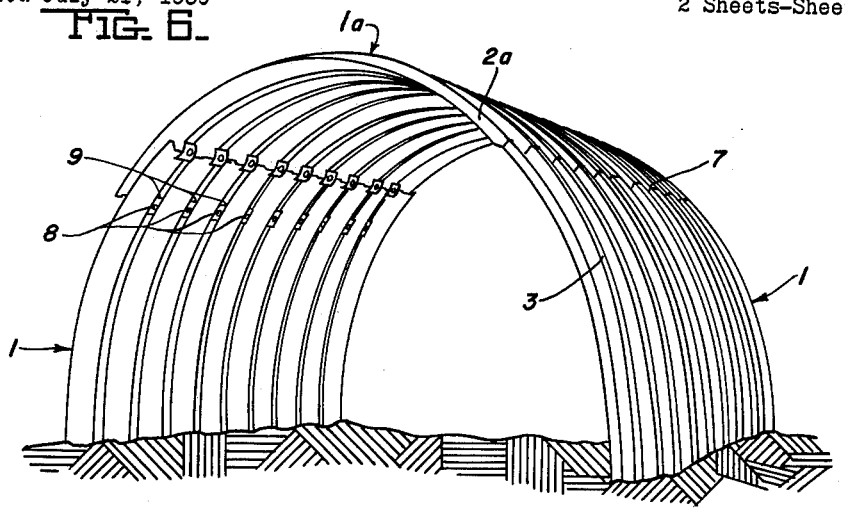

FIGURE 6, a perspective view of the same assemblage, seen from the inside,

FIGURE 7, a partial plan view, illustrating the assemblage of elements in accordance with the invention for lining a mine shaft, As will be seen from the drawings, an element 1 of the frame in accordance with the invention comprises a metal sheet of appropriate strength, e.g. 5 mm. thick, profiled by pressing in such a manner as to have the shape seen in FIGURE 1. This shape is substantially that of a flattened U, with a generally flat base, inclined limbs 2 and wings 3 extending these limbs in a plane parallel to that of the base. The latter actually comprises a slight middle elevation 4 bounded by two lateral grooves 5, the whole being substantially flat. Each of these elements is bent to the shape of an arc in the direction of its length. This length varies according to the dimensions of the gallery or shaft to be lined and depending upon whether each span is to be formed by two elements or three elements. In the former case, each of the two elements must have a length sufficient for enabling it to extend up a respective wall of the gallery and then to bend over beneath the vault to such an extent as to overlap a companion element extending up the opposite wall. In the case of three elements being used, two are used as leg members and extend up respective walls to a suitable height where they support and are overlapped at their ends by the extremities of the third element which is a crown member and serves to line the vault. In preparing the elements for use in accordance with the invention, some are bent longitudinally in the direction which causes the mouth of the channel section to be presented outwardly of the curve. Such elements will be hereinafter referred to as having a flat U-section. Other lengths, however, are bent reversely and so that the mouth of the channel section is presented inwardly of the curve. Such elements will be hereinafter referred to as having a flat omega-section. In FIGURES 4 and 4a elements of U-section are marked 1 and elements of omega-section are marked 1a.

FIGURES 2 and 3 show two types of stirrups for connecting two elements of the kinds described above. These stirrups comprise a bolt 6 with a head 7, preferably of the shape of a hammer or T, and a nut 8. The stirrup of FIGURE 2 also comprises a U-shaped locking piece with or without two lateral wings 10. The stirrup of FIGURE 3 is similar to that of FIGURE 2 except that it comprises two locking plates 11 of very flattened U-section, whose dimensions correspond substantially to those of the elevation 4 of the element 1, with two wide wings 12. The piece 9 and each of the plates 11 is pierced with a hole for the free passage of the bolt 6.

FIGURES 4 to 6 illustrate the connection of elements of the kind shown in FIGURE 1 by means of stirrups of the type shown in FIGURE 2. The elements are connected by interfitting and overlapping them. In the simplest case of a semi-circular gallery of small radius, use may be made of two elements only, each having a length rather more than a quarter of the circle having the same radius as the gallery. If the profile of the gallery is not circular, the elements will have an appropriate curvature and a length which is rather more than half of the section of the gallery. These elements form a right leg and a left leg. If the right leg has a curvature in the direction in which it has the aforesaid U-section, then the left leg is reversely bent so that it has the aforesaid omega-section. One right leg then interfits with two left legs and conversely, with appropriate overlapping at their upper end. In the case of a gallery of larger dimensions, use is made of two legs and a crown. The curvature of the legs is then such that their section, seen from the interior of the gallery once the frame is in position, may be that of FIGURE 1 (i.e. of U-section), whereas the curvature of the crown is the reverse (i.e. its section is of omega-shape). The interfitting of the two is effected in the manner shown in FIGURES 4 to 6. If the right legs (in the case of an assemblage of two elements) or the legs (in the case of an assemblage of three elements) are designated 1 and the left legs (in the case of an assemblage of two elements) or the crowns (in the case of an assemblage of three elements) are designated 1a, it will be seen that the middle elevation 4 of the base of each of the elements 1 is located between the wings 3a of two elements 1a and that the corresponding elevation 4a of each element 1a is located between the wings 3 of two adjacent elements 1. The sides 2 and 2a of the two kinds of elements are in contact with each other and the wings 3 or 3a rest against the bottoms of the grooves 5 or 5a respectively. FIGURES 5 and 6 illustrate a portion of a length of gallery lining erected by employment of legs 1 and crowns 1a. The assemblage is held by stirrups similar to that described with reference to FIGURE 2. The bolts are positioned, as shown in FIGURES 5 and 6, between two adjacent elements of a like kind and bear against an end of an intervening element, so that the bolt stems extend freely through the space between the adjacent like elements. The head 7 preferably has the shape of a hammer or of a T, so as to be able to present its narrow width when introducing it into the space formed between two adjacent plate elements, and then, in the case of the bolts as shown in FIGURE 4, to turn it through 90° so as to cause its greater length to overlap the surface of the wings 3 or 3a. For sake of convenience, the heads 7 are always located outside of the lining. For the bolts in the upper row on the line IV—IV in FIGURE 5 (see also FIGURES 4 and 6), the head 7 takes against the wings 3a of two adjacent crown elements 1a; the lower wing 10 of the clamping part 9 takes against the outside surface of the grooves 5 of the associated leg elements 1, and the upper wing 10 takes against the wings 3a of the aforesaid crown elements 1a. The curved shape of these clamping plates 9 permits them to take up the slight difference in thickness in the region of the bolt (equal to the thickness of the plate elements 1 and 1a). For the bolts in the lower row on the line IVa—IVa in FIGURE 5 (see also FIGURES 4a and 6), the head 7 is disposed with its larger dimension parallel with the axis of the plate elements 1 and 1a; the bolt stem constitutes an abutment member for the end of the crown element 1a, and the wings 10 of the clamping plate 9 take against the wings 3 of two adjacent leg elements 1. When using a stirrup of the type shown in FIGURE 3, the location is similar to that just described, but the plate 11 adjacent the head 7 of the bolt would take against the parts 3a in FIGURE 4 or 5a in FIGURE 4a.

FIGURE 7 illustrates how the elements 1 and 1a can be disposed to produce a shaft lining. This diagrammatic figure does not show the stirrups.

To produce the assemblage in the case of a frame of two elements, a right leg and a left leg are placed in a conventional manner in shoes or supporting members at their respective side walls and with their heads raised and fitted one in the other. A further left leg is then placed in its shoe, its head is raised and is fitted in the end of the right leg already in position and then a stirrup is positioned and its nut tightened. A right leg and a left leg continue to be positioned alternately.

In the case of a frame of three elements, two legs are placed one opposite the other at respective sides and a crown is placed on their ends in overlapping relationship. The assemblage holds very well in equilibrium and there is ample time to position the stirrups. As is shown by FIGURES 5 and 6, a stirrup is provided at the end of each element and the bolt heads 7 appear in the interval between two legs or two crowns.

The first elements of frames for supporting a mine gallery should obviously be placed in position after the floor of the gallery has been cleared.

This invention possesses a number of advantages. First by reason of the same construction of the frame elements, if the first frame is positioned strictly in direction, all the following ones will also be placed correctly.

All the elements when assembled constitute a resistant homogeneous shield. The distribution of the loads is effected in a substantially perfect manner. If the stirrups are suitably tightened, it is impossible for the elements to shift.

Moreover, transport is facilitated by the easy fitting of the elements one in another. There is no manipulation of piles, grating members, sheet pilings, stays, half hooks etc.

The erected support is totally incombustible and its maintenance practically nil.

It is to be understood that the details of construction described and illustrated have only been given by way of example and are capable of modification without departing from the scope of the invention as defined in the appended claims.

I claim:

1. Means for supporting or lining the roof and walls of mine galleries, or the walls of pits, mine shafts or like excavations, comprising a plurality of elongated elements which are arched lengthwise and overlap partially one another laterally along the length of the excavation, the elements being of two kinds of which a first kind alternates with a second kind along the length of the excavation, each of said elements extending over only a part of the cross-section of the excavation, the first kind of element presenting a substantially flat omega channel section as viewed from the interior of the excavation and the second kind of element presenting a substantially flat U channel section from the same point of view, the two kinds of channel section each having outwardly inclined side walls, a base along the middle of which is formed a flat shallow inwardly extending salient bounded by two flat bottomed grooves, and a flange wing formed along the free edge of each side wall in a plane substantially parallel to the planes of the flat inward salient and of the flat bottom of the grooves, the two kinds of elements overlapping each other at adjacent side walls but only along one end portion of each element, and connecting stirrups comprising at least a clamping piece, a T-headed bolt and a tightening nut, one such stirrup being positioned at the free end of an element and engaged both with said free end and with the lateral wings of two adjacent elements, and the stem of the bolt being positioned against the free edges of the salient at the end of an element.

2. The combination as defined in claim 1 wherein each connecting stirrup comprises two clamping pieces adapted for gripping between them the side wings of two adjacent frame elements and having a very flat U-section with two wide wings and dimensions which permit of exact application against the base of an adjacent frame element or against the middle salient of the base of an element and the wings of two adjacent elements.

3. In a frame arrangement for a mine gallery or the like, the combination set forth in claim 1, wherein both types of frame element have a length a little greater than one half of the contour of the gallery measured from the ground to the ground and are disposed with their non-overlapping ends bearing on said ground.

4. In a frame arrangement for a mine gallery or the like, the combination set forth in claim 1, wherein two U-shaped frame elements are positioned with their planes of symmetry in a same vertical plane perpendicular to the longitudinal axis of the gallery and one omega-shaped frame element is disposed in the aforesaid overlapping relation over both the U-shaped frame elements, one end of the omega-shaped frame element cooperating with one of the U-shaped frame element and the other end of said omega-shaped frame element cooperating with the other U-shaped frame element, whereby the U-shaped frame elements constitute the feet and the omega-shaped frame element the crown of a frame.

5. The combination set forth in claim 1, wherein each connecting stirrup comprises a clamping piece of U-section, the base of which is pierced with a hole for the passage of the bolt.

References Cited in the file of this patent

UNITED STATES PATENTS

| Re. 21,752 | Cushwa et al. | Mar. 18, 1941 |
| 1,430,931 | Blackall | Oct. 3, 1922 |
| 1,528,777 | Marting | Mar. 10, 1925 |
| 2,729,064 | Kennedy et al. | Jan. 3, 1956 |

FOREIGN PATENTS

| 651,660 | Germany | Apr. 6, 1939 |
| 186,594 | Austria | Aug. 25, 1956 |
| 1,151,822 | France | Aug. 26, 1957 |